US009367089B2

(12) United States Patent
Chang et al.

(10) Patent No.: US 9,367,089 B2
(45) Date of Patent: Jun. 14, 2016

(54) ELECTRONIC APPARATUS COMBINED WITH MAGNETIC ATTRACTION FORCE

(71) Applicant: Acer Inc., New Taipei (TW)

(72) Inventors: Yi-Mu Chang, New Taipei (TW); Chyun-Nan Liu, New Taipei (TW)

(73) Assignee: Acer Inc., New Taipei (TW)

( * ) Notice: Subject to any disclaimer, the term of this patent is extended or adjusted under 35 U.S.C. 154(b) by 38 days.

(21) Appl. No.: 14/335,978

(22) Filed: Jul. 21, 2014

(65) Prior Publication Data

US 2015/0070118 A1 Mar. 12, 2015

(30) Foreign Application Priority Data

Sep. 9, 2013 (TW) .............................. 102132394 A

(51) Int. Cl.
*G06F 1/16* (2006.01)
(52) U.S. Cl.
CPC ..................................... *G06F 1/1632* (2013.01)
(58) Field of Classification Search
None
See application file for complete search history.

(56) References Cited

U.S. PATENT DOCUMENTS

| 7,541,907 | B2 * | 6/2009 | Wang ..................... G06F 1/1632 335/214 |
| 8,143,983 | B1 * | 3/2012 | Lauder .................. G06F 1/1626 24/303 |
| 8,242,868 | B2 * | 8/2012 | Lauder .................. G06F 1/1647 24/303 |
| 8,289,115 | B2 * | 10/2012 | Cretella, Jr. ........... G06F 1/1626 206/320 |
| 8,498,100 | B1 * | 7/2013 | Whitt, III .............. G06F 1/1618 361/679.17 |
| 8,576,030 | B2 * | 11/2013 | Zhang .................... H01H 15/24 335/205 |
| 8,599,542 | B1 * | 12/2013 | Healey .................. G06F 1/1626 345/168 |
| 8,889,985 | B2 * | 11/2014 | Shi ....................... H04M 1/0216 174/50 |
| 8,934,219 | B2 * | 1/2015 | Gartrell ................. G06F 1/1616 248/229.22 |
| 9,025,321 | B2 * | 5/2015 | Liang .................... G06F 1/1669 361/679.01 |
| 9,052,869 | B2 * | 6/2015 | Wang ..................... G06F 1/1626 |
| 9,134,808 | B2 * | 9/2015 | Siddiqui ............... G06F 1/1618 |

(Continued)

FOREIGN PATENT DOCUMENTS

TW 201407315 A * 2/2014 ................ G06F 1/16

*Primary Examiner* — Hoa C Nguyen
*Assistant Examiner* — Xanthia C Cunningham
(74) *Attorney, Agent, or Firm* — Alan D. Kamrath; Kamrath IP Lawfirm, P.A.

(57) ABSTRACT

An electronic apparatus combined with a magnetic attraction force includes a first body and a second body. The first body includes at least one first magnetic element, and the second body includes at least one receiving groove, at least one moving assembly, and at least one assistant magnetic element. Each moving assembly is movably disposed in each receiving groove, and each moving assembly includes a second magnetic element. Each assistant magnetic element is fixed in the receiving groove, and the magnetic attraction force between the assistant magnetic element and the second magnetic element is smaller than that between the first magnetic element and the second magnetic element. When the second body is combined with the first body, each second magnetic element is attracted by each first magnetic element, such that each moving assembly is driven to move toward the first body.

9 Claims, 3 Drawing Sheets

(56) References Cited

U.S. PATENT DOCUMENTS

| | | | | |
|---|---|---|---|---|
| 2004/0005184 A1* | 1/2004 | Kim | ............... | G06F 1/1618 400/472 |
| 2005/0271450 A1* | 12/2005 | Cheng | ............... | B41J 29/02 400/693 |
| 2006/0006674 A1* | 1/2006 | Kang | ............... | E05C 19/16 292/251.5 |
| 2006/0125585 A1* | 6/2006 | Lo | ............... | G06F 1/1616 335/285 |
| 2007/0133156 A1* | 6/2007 | Ligtenberg | ............... | G06F 1/1616 361/679.27 |
| 2008/0136197 A1* | 6/2008 | Lin | ............... | E05C 19/06 292/251.5 |
| 2008/0158800 A1* | 7/2008 | Aoyagi | ............... | G06F 1/1616 361/679.01 |
| 2008/0174392 A1* | 7/2008 | Cho | ............... | H04M 1/0237 335/285 |
| 2009/0051174 A1* | 2/2009 | Ho | ............... | E05C 1/10 292/251.5 |
| 2009/0103261 A1* | 4/2009 | Shih | ............... | E05C 19/16 361/679.58 |
| 2010/0123663 A1* | 5/2010 | Leung | ............... | G06F 3/0231 345/169 |
| 2010/0238620 A1* | 9/2010 | Fish | ............... | G06F 1/1616 361/679.09 |
| 2012/0068797 A1* | 3/2012 | Lauder | ............... | G06F 1/1647 335/285 |
| 2012/0286908 A1* | 11/2012 | Liang | ............... | G06F 1/1658 335/205 |
| 2013/0094134 A1* | 4/2013 | Ashcraft | ............... | G06F 1/1615 361/679.29 |
| 2013/0128453 A1* | 5/2013 | Lin | ............... | G06F 3/0202 361/679.56 |
| 2013/0169393 A1* | 7/2013 | Dieny | ............... | B25J 7/00 335/285 |
| 2013/0170126 A1* | 7/2013 | Lee | ............... | G06F 1/1654 361/679.17 |
| 2013/0265123 A1* | 10/2013 | Zhang | ............... | H01H 15/24 335/205 |
| 2013/0279096 A1* | 10/2013 | Gengler | ............... | H05K 7/00 361/679.01 |
| 2014/0313665 A1* | 10/2014 | Delpier | ............... | G06F 1/1616 361/679.55 |

* cited by examiner

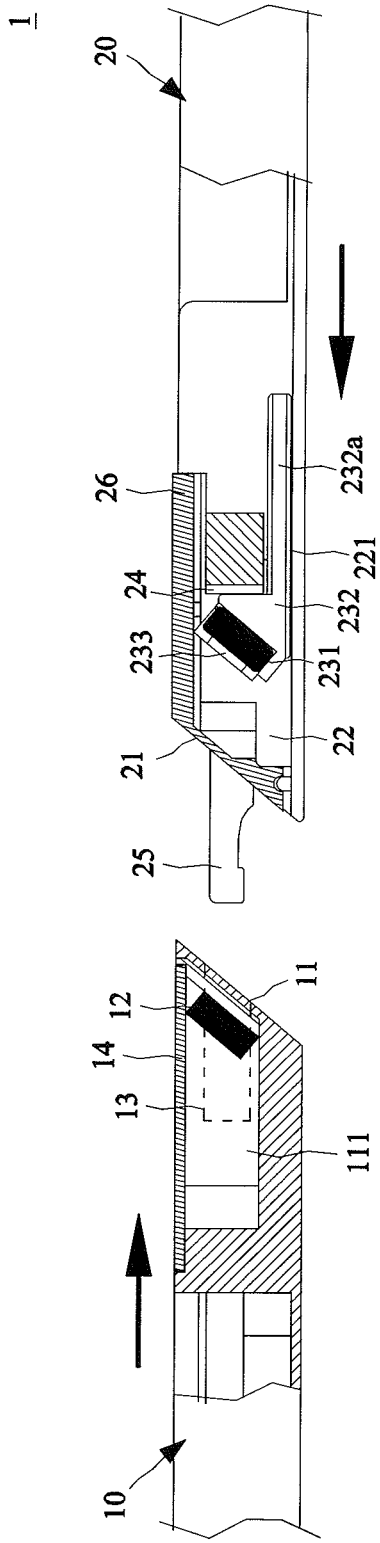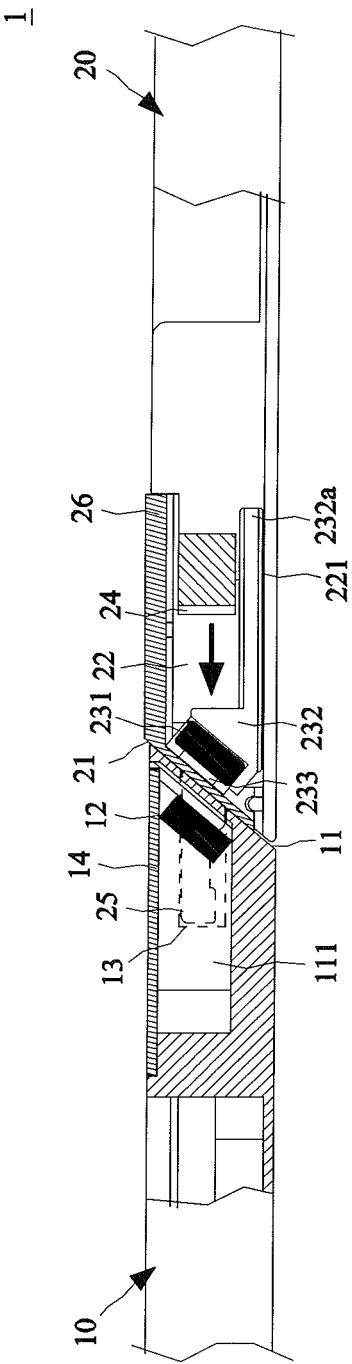

ELECTRONIC APPARATUS COMBINED WITH MAGNETIC ATTRACTION FORCE

BACKGROUND OF THE INVENTION

1. Field of the Invention

The present invention relates to an electronic apparatus and, more particularly, to an electronic apparatus applying a magnetic attraction force to combine different parts.

2. Description of the Related Art

Generally, for most electronic apparatus, bolts are utilized to combine different parts during the assembly or manufacturing process. However, this bolted assembly process requires much time for disassembly. The increased time cost increases the assembly cost and causes inconvenience in the assembly process. In order to reduce the time cost of assembling different parts, one of the current methods is to respectively dispose magnetic elements on different parts of the apparatus to achieve an auxiliary combination effect of the parts by the magnetic attraction between the magnets during the assembly process.

In order to tightly combine different parts of an electronic apparatus, a magnet with a stronger magnetic attraction force is necessary. However, if the two parts are not completely aligned during assembly, the two parts will be attracted to each other due to the strong magnetic attraction force of the magnet. Therefore, dislocations that can occur between the two parts may complicate the assembly process.

Therefore, there is a need to overcome the disadvantages of the current electronic apparatus combined with magnetic attraction force in order to increase the convenience of assembly and reduce the occurrence of dislocations during the process of combining the two parts.

SUMMARY OF THE INVENTION

It is a main object of the present invention to provide an electronic apparatus applying a magnetic attraction force to combine different parts.

To achieve the abovementioned object, the electronic apparatus of the present invention comprises a first body and a second body. The first body comprises a first combination side and at least one first magnetic element, and each first magnetic element is disposed on the first combination side. The second body comprises a second combination side corresponding to the first combination side, at least one receiving groove disposed on the second combination side, at least one moving assembly, and at least one assistant magnetic element. Each moving assembly is movably disposed in each receiving groove and comprises a second magnetic element. Each assistant magnetic element is fixed in the receiving groove and far away from the second combination side. The magnetic attraction force between the assistant magnetic element and the second magnetic element is smaller than that between the first magnetic element and the second magnetic element.

When the second body is not combined with the first body, each second magnetic element is attracted by each assistant magnetic element to fix each moving assembly. When the second combination side of the second body is combined with the first combination side of the first body, each second magnetic element is attracted by each first magnetic element to break the attraction with the assistant magnetic element, such that each moving assembly can move toward the second combination side.

By this design, when the first body of the electronic apparatus of the present invention is not combined with the second body or before the first body and the second body are completely assembled and aligned, the moving assembly is capable of being fixed at a position far away from the second combination side by the magnetic attraction force between the second magnetic element and the assistant magnetic element and will not be easily moved. When the first body contacts the second body for combination of the two bodies, the magnetic attraction of the first magnetic element to the second magnetic element drives the moving assembly to move toward the second combination side for providing an auxiliary combination effect between the first body and the second body.

BRIEF DESCRIPTION OF THE DRAWINGS

FIG. 3 is a cross-sectional drawing showing an electronic apparatus combined with a magnetic attraction force before the combination of a first body with a second body according to the present invention; and FIG. 4 is a cross-sectional drawing showing an electronic apparatus combined with a magnetic attraction force after the combination of a first body with a second body according to the present invention.

DETAILED DESCRIPTION OF THE PREFERRED EMBODIMENTS

To clarify the objects of the present invention, a preferred embodiment is illustrated.

Figure 1:
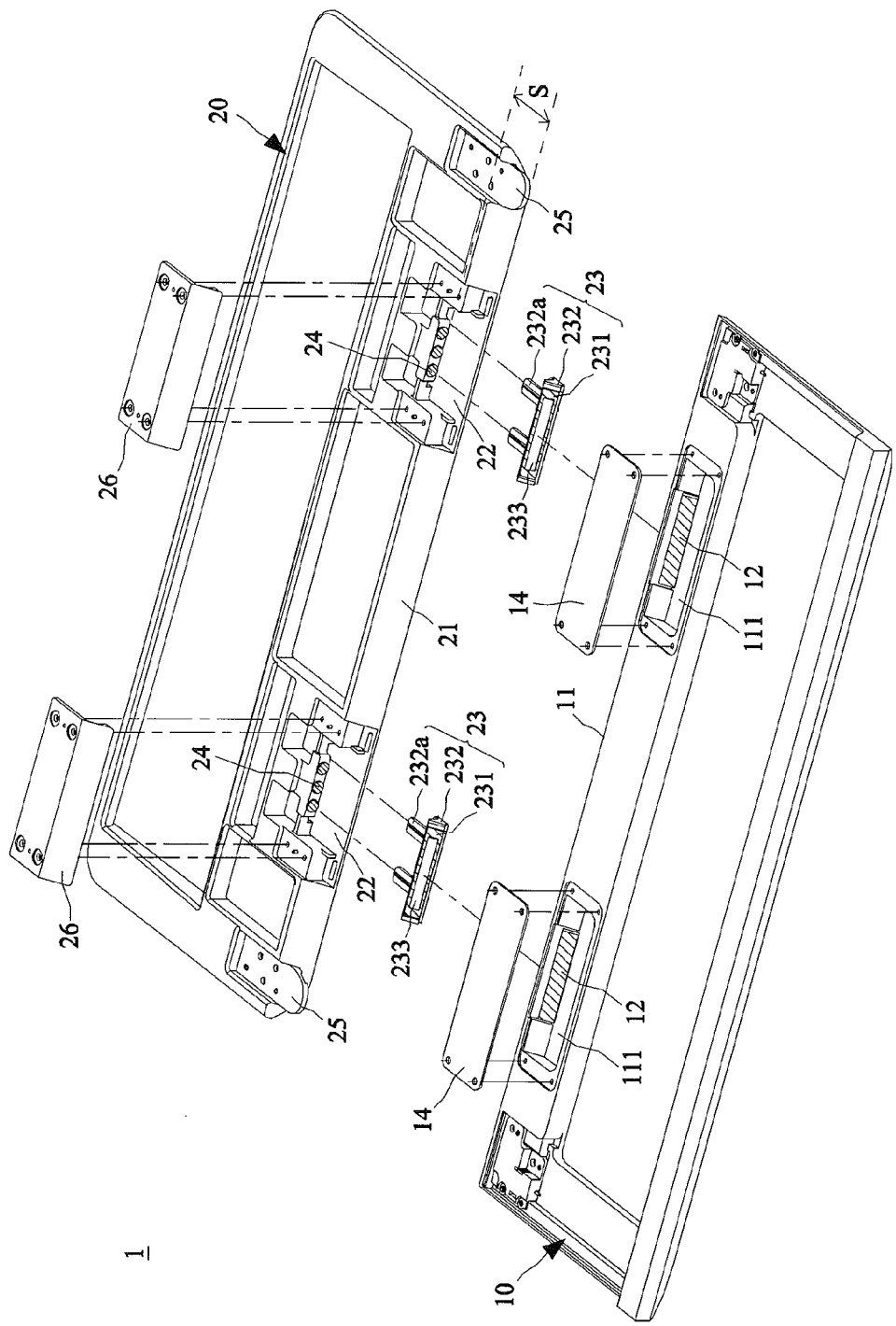
FIG. 1 is a schematic drawing showing a structure of an electronic apparatus combined with a magnetic attraction force according to the present invention.
Figure 2:
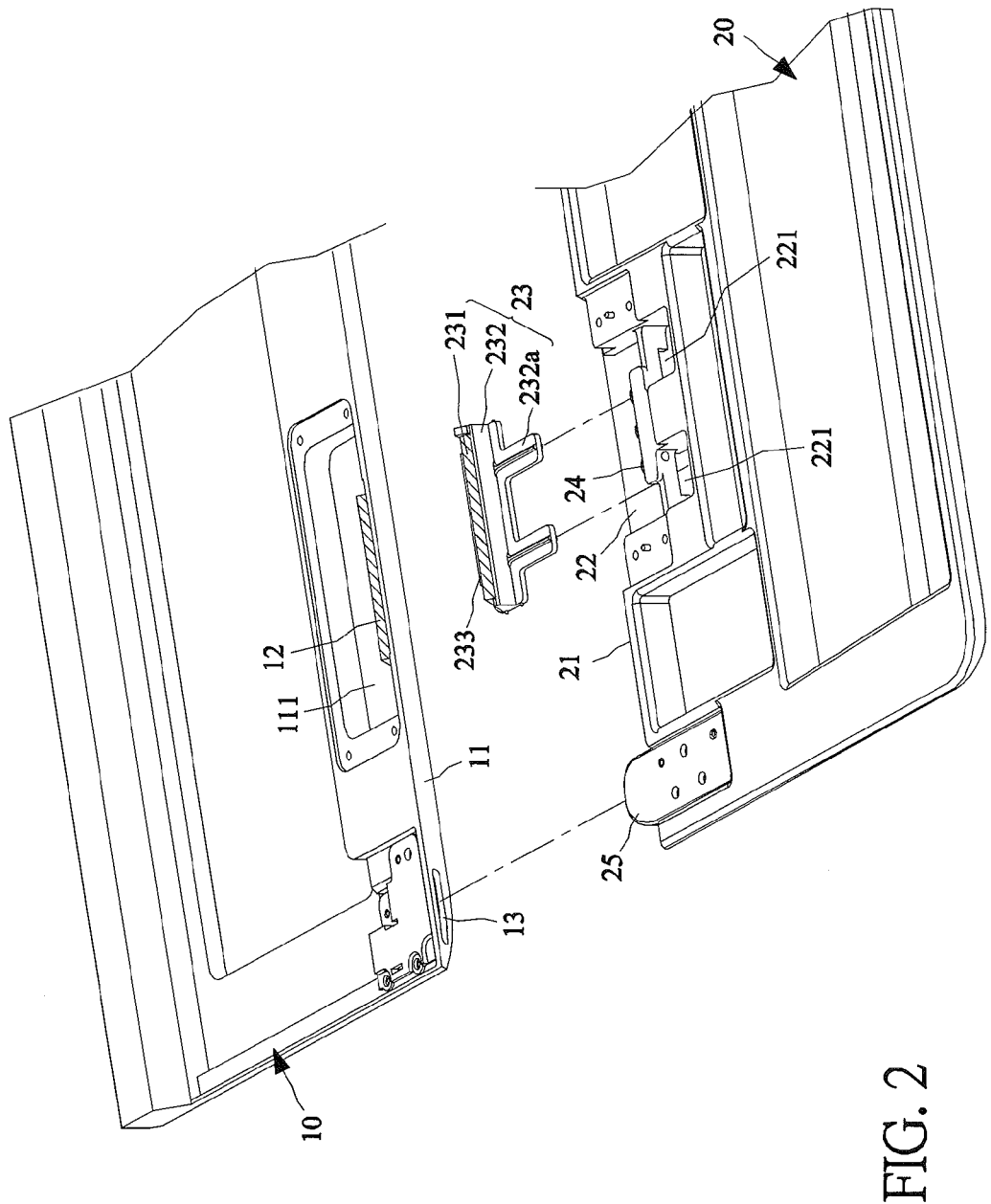
FIG. 2 is a schematic drawing showing a partial structure of an electronic apparatus combined with a magnetic attraction force according to the present invention.

Please refer to FIG. 1 in conjunction with FIG. 2. FIG. 1 is a schematic drawing showing a structure of an electronic apparatus combined with a magnetic attraction force according to the present invention. FIG. 2 is a schematic drawing showing a partial structure of an electronic apparatus combined with a magnetic attraction force according to the present invention. The electronic apparatus combined with the magnetic attraction force of the present invention can be applied to a portable electronic apparatus such as a portable computer, a tablet, and a docking station thereof. However, the present invention is not limited thereto and can also be applied to other electronic apparatus having similar structures.

As shown in FIG. 1 and FIG. 2, the electronic apparatus combined with the magnetic attraction force 1 of the present invention comprises a first body 10 and a second body 20. The first body 10 comprises a first combination side 11 and at least one first magnetic element 12. Each first magnetic element 12 is disposed on the first combination side 11. In the present embodiment, two receiving spaces 111 are symmetrically disposed by using the central position of the first combination side 11 as a standard, and each receiving space 111 receives, respectively, a first magnetic element 12 to construct a design having a symmetrical structure. However, the present invention is not limited thereto and can be varied according to the different amounts of the required first magnetic elements 12. For example, the present invention also can use a single first magnetic element 12. That is, only one receiving space 111 is disposed on the central position of the first combination side 11 for receiving the single first magnetic element 12. The first magnetic element 12 herein can be a magnet.

The first body 10 further comprises at least one first positioning portion 13 (please refer to FIG. 2) for providing the auxiliary positioning effect of combining the first body 10 with the second body 20. In the present embodiment, the first body 10 uses two first positioning portions 13 disposed, respectively, at two ends of the first combination side 11, and the structure of the first positioning portion 13 is varied to cooperate with the corresponding structure of the second body 20.

In addition, the first body 10 further comprises at least one first upper cover 14, and the amount of the first upper covers 14 corresponds to the amount of the receiving spaces 111. Each first upper cover 14 is used for being fixed to cover each receiving space 111 for shielding the receiving space 111 and for maintaining the unity of the appearance of the first body 10.

The second body 20 comprises a second combination side 21 corresponding to the first combination side 11, at least one receiving groove 22, at least one moving assembly 23, and at least one assistant magnetic element 24. The second combination side 21 corresponds to the first combination side 11, such that the first body 10 is capable of using the first combination side 11 to contact the second combination side 21 of the second body 20 to facilitate engagement. To cooperate with the configuration of the first magnetic element 12, the amounts and the disposed positions of the at least one receiving groove 22 of the second body 20, the at least one moving assembly 23, and the at least one assistant magnetic element 24 all correspond to the amounts and the disposed positions of the at least one first magnetic elements 12 in the present embodiment (in the present embodiment, all the amounts of the abovementioned elements are two, but the present invention is not limited thereto).

The at least one receiving groove 22 is disposed on the second combination side 21, and each receiving groove 22 is used to receive each moving assembly 23. Each receiving groove 22 extends from the second combination side 21 toward the inside of the second body 20. Each moving assembly 23 is movably disposed in each receiving groove 22 and comprises a second magnetic element 231 and a support 232. The support 232 is used to carry the second magnetic element 231 and combine with it. Therefore, the support 232 can follow the second magnetic element 231 to move in the receiving groove 22. The second magnetic element 231 herein can be a magnet.

In the present embodiment, the support 232 comprises at least one guiding portion 232a for maintaining the stability of the moving assembly 23 when the moving assembly 23 moves and for preventing offsets. The receiving groove 22 comprises at least one corresponding guiding portion 221. When the moving assembly 23 moves in the receiving groove 22, each moving assembly 23 can move only along a substantially linear direction in the receiving groove 22 due to the function of guiding and limiting provided by the cooperation between each guiding portion 232a of the support 232 and each corresponding guiding portion 221 of the receiving groove 22. Each guiding portion 232a herein is a guiding rod, and each corresponding guiding portion 221 is a guiding groove for the guiding rod to pass along (in the present embodiment, both the amount of the guiding rod and that of the guiding groove are two, but the present invention is not limited thereto. That is, the cooperation between a single guiding rod and a single guiding groove also falls within the spirit and scope of the present invention).

In addition, each moving assembly 23 further comprises a damper element 233 for providing a buffering effect of moving each moving assembly 23 to contact the second combination side 21 and reducing the possible sound of an impact. In an embodiment of the present invention, the damper element 233 is fixed on the second magnetic element 231, such that the damper element 233 is closer to the second combination side 21 than to the second magnetic element 231 or to the support 232. That is, the moving assembly 23 will use the damper element 233 to contact the second combination side 21 first when the moving assembly 23 contacts the second combination side 21, but the present invention is not limited thereto. For example, the damper element 233 can also be fixed on the support 232 according to different designs while still providing the moving assembly with a buffering effect on the contact with the second combination side 21. The amount and the disposed position of the damper element 233 also can be adjusted. For example, a single damper element 233 can be adhered on the surface of the second magnetic element 231, or two damper elements 233 can be fixed respectively at two ends of the second magnetic element 231.

The assistant magnetic element 24 is fixed in the receiving groove 22, and the disposed position thereof is far away from the second combination side 21 for fixing the moving assembly 23 in a position far away from the second combination side 21. In the present embodiment, the receiving groove 22 comprises the corresponding guiding portion 221, and there is an interval S between the corresponding guiding portion 221 and the second combination side 21 for fixing each assistant magnetic element 24 by the corresponding guiding portion 221. The assistant magnetic element 24 herein can be a magnetic material in itself or a material capable of being attracted by magnetic attraction force, such as a magnet or a metal sheet. The magnetic attraction force between the assistant magnetic element 24 and the second magnetic element 231 is smaller than that between the first magnetic element 12 and the second magnetic element 231.

The second body 20 further comprises at least one second positioning portion 25 for cooperating with the abovementioned first positioning portion 13 to provide an auxiliary positioning effect during combination of the first body 10 and the second body 20. In the present embodiment, the second body 20 also utilizes two second positioning portions 25 disposed, respectively, at the two ends of the second combination side 21, and the position thereof corresponds to the two first positioning portions 13 of the first body 10. Each first positioning portion 13 is a recess, and each second positioning portion 25 is a tenon capable of being inserted into the recess. However, these two structures are to be understood to be interchangeable.

In addition, the second body 20 further comprises at least one second upper cover 26, and the amount of the second upper covers 26 corresponds to the amount of the receiving grooves 22. Each second upper cover 26 is used for being fixed in place to cover each receiving groove 22 for providing an effect of shielding the receiving groove 22 and for maintaining the unity of the appearance of the second body 20. Furthermore, the second upper cover 26 can provide an additional stopping function for the moving assembly 23.

Please refer to FIG. 3, which is a cross-sectional drawing showing the electronic apparatus combined with the magnetic attraction force 1 before combination of the first body 10 with the second body 20 according to the present invention. As shown in FIG. 3, for facilitating the combination of the first body 10 with the second body 20, the first combination side 11 in the present embodiment is designed to be an inclined structure, and the second combination side 21 is designed to be another inclined structure corresponding to the abovementioned inclined structure. The contact area is increased by the inclined structure, and the cooperation of the two inclined structures is beneficial for the mutual combination of the first and second combination sides 11, 21. However, the present invention is not limited thereto. If a portable electronic apparatus is used as an example of the electronic apparatus combined with the magnetic attraction force 1 of the present invention, the first body can be a system end of the apparatus, and the second body 20 can be a keyboard module of the apparatus. However, the present invention is not limited thereto. That is, the first body 10 and the second body 20 are to be understood to be interchangeable.

When the second body 20 is not combined with the first body 10, a magnetic attraction force of each assistant magnetic element 24 against each second magnetic element 231 is provided to prevent the moving assembly 23 of the second body 20 disposed in the receiving groove 22 from randomly moving and to keep it away from the attraction of the magnetic material in the surrounding second body 20. Accordingly, each second magnetic element 231 is attracted by the magnetic attraction of each assistant magnetic element 24, such that the moving assembly 23 can be fixed in a position far away from the second combination side 21. That is, the situation of the moving assembly 23 will be maintained before the first body is aligned and assembled with the second body 20.

Please refer to FIG. 4, which is a cross-sectional drawing showing an electronic apparatus combined with a magnetic attraction force after the combination of a first body with a second body according to the present invention. As shown in FIG. 4, the first combination side 11 of the first body 10 and the second combination side 21 of the second body 20 are close to each other in the situation illustrated in FIG. 3. Subsequently, they are assembled by the first positioning portion 13 of the first body 10 being aligned with the second positioning portion 25 of the second body 20. Because the magnetic attraction force between the assistant magnetic element 24 and the second magnetic element 231 is smaller than that between the first magnetic element 12 and the second magnetic element 231, the second magnetic element 231 is attracted by the first magnetic element 12 to break the attraction with the assistant magnetic element 24, such that the moving assembly 23 can move toward the second combination side 21 until it contacts the second combination side 21. The moving assembly 23 will be limited by the guiding portion 232*a* of the support 232 and the corresponding guiding portion 221 of the receiving groove 22 during the movement, such that the moving assembly 23 can follow only the direction of the arrow shown in the figure to move along a substantially straight line. Therefore, the stronger magnetic attraction force between the first magnetic element 12 and the second magnetic element 231 causes the moving assembly 23 to move until it is positioned to achieve an effect of tightly combining the first body 10 and the second body 20.

When the moving assembly 23 moves to contact the second combination side 21, the impact of the moving assembly 23 against the second combination side 21 is eased by disposing the abovementioned at least one damper element 233 to provide a buffering effect. Then, it can be confirmed by the user hearing the sound of the impact that the moving assembly 23 has already moved into position for providing the effect of magnetic attraction between the first body 10 and the second body 20.

Thus, the moving assembly will be fixed at a position far away from the second combination side and will not be activated before the first body of the electronic apparatus combined with the magnetic attraction force of the present invention is combined with the second body or before the first body is completely aligned and assembled with the second body. When the first body and the second body are mutually aligned to be assembled, the stronger magnetic attraction force between the first magnetic element and the second magnetic element drives the moving assembly to move toward the second combination side for providing the auxiliary combination effect between the first body and the second body.

Although the present invention has been explained in relation to its preferred embodiments, it is to be understood that many other possible modifications and variations can be made without departing from the spirit and scope of the invention as hereinafter claimed.

What is claimed is:

1. An electronic apparatus combined with magnetic attraction force, comprising:
   a first body including a first combination side and at least one first magnetic element, wherein each first magnetic element is disposed on the first combination side;
   a second body including a second combination side combined with the first combination side, at least one receiving groove, at least one moving assembly, and at least one assistant magnetic element, wherein the at least one receiving groove is disposed on the second combination side, each moving assembly is movably disposed in the receiving groove and comprises a second magnetic element, the assistant magnetic element is fixed in the receiving groove and far away from the second combination side, and the magnetic attraction force between the assistant magnetic element and the second magnetic element is smaller than that between the first magnetic element and the second magnetic element, wherein each moving assembly further has a support and the second magnetic element is combined with the support, wherein the support is able follow the second magnetic element as the second magnetic element moves in the at least one receiving groove, wherein each moving assembly further comprises at least one damper element to provide a buffering effect on contact of each moving assembly with the second combination side;
   wherein when the second body is not combined with the first body, each second magnetic element is attracted by each assistant magnetic element to fix each moving assembly,
   wherein when the second combination side of the second body is combined with the first combination side of the first body, each second magnetic element is attracted by each first magnetic element to separate from the assistant magnetic element such that each moving assembly can move toward the second combination side.

2. The electronic apparatus combined with magnetic attraction force as claimed in claim 1, wherein each damper element is fixed on each second magnetic element or each support and is closer to the second combination side than to each second magnetic element or each support.

3. An electronic apparatus combined with magnetic attraction force, comprising:
   a first body including a first combination side and at least one first magnetic element, wherein each first magnetic element is disposed on the first combination side;
   a second body including a second combination side combined with the first combination side, at least one receiving groove, at least one moving assembly, and at least one assistant magnetic element, wherein the at least one receiving groove is disposed on the second combination side, each moving assembly is movably disposed in the receiving groove and comprises a second magnetic element, the assistant magnetic element is fixed in the receiving groove and far away from the second combination side, and the magnetic attraction force between the assistant magnetic element and the second magnetic element is smaller than that between the first magnetic element and the second magnetic element, wherein the second body further comprises at least one second upper cover and each second upper cover is used for being fixed on each receiving groove for shielding each receiving groove;

wherein when the second body is not combined with the first body, each second magnetic element is attracted by each assistant magnetic element to fix each moving assembly, wherein when the second combination side of the second body is combined with the first combination side of the first body, each second magnetic element is attracted by each first magnetic element to separate from the assistant magnetic element such that each moving assembly can move toward the second combination side.

4. The electronic apparatus combined with magnetic attraction force as claimed in claim 3, wherein each moving assembly further has a support and the second magnetic element is combined with the support, and wherein the support is able follow the second magnetic element as the second magnetic element moves in the at least one receiving groove.

5. The electronic apparatus combined with magnetic attraction force as claimed in claim 4, wherein each support includes at least one guiding portion and the at least one receiving groove includes at least one corresponding guiding portion, wherein each support moves along a substantially linear direction in the at least one receiving groove by cooperation between each guiding portion and each corresponding guiding portion.

6. The electronic apparatus combined with magnetic attraction force as claimed in claim 5, wherein each guiding portion is a guiding rod and each corresponding guiding portion is a guiding groove for the guiding rod to pass along.

7. The electronic apparatus combined with magnetic attraction force as claimed in claim 3, wherein the first body further comprises at least one first positioning portion and the second body further comprises at least one second positioning portion corresponding to the at least one first positioning portion to provide an auxiliary positioning effect of combining the first body and the second body by cooperation between each first positioning portion and each second positioning portion.

8. The electronic apparatus combined with magnetic attraction force as claimed in claim 7, wherein each first positioning portion is a recess and each second positioning portion is a tenon inserted into the recess.

9. The electronic apparatus combined with magnetic attraction force as claimed in claim 3, wherein the first combination side is an inclined structure and the second combination side is an another inclined structure corresponding to the inclined structure of the first combination side.

* * * * *